(12) United States Patent
Sim et al.

(10) Patent No.: US 12,309,383 B2
(45) Date of Patent: *May 20, 2025

(54) METHOD FOR RECONSTRUCTING CHROMA BLOCK AND VIDEO DECODING APPARATUS

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Sea Nae Park, Seoul (KR); Seung Wook Park, Gyeonggi-do (KR); Wha Pyeong Lim, Gyeonggi-Do (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,596

(22) Filed: Nov. 15, 2023

(65) Prior Publication Data

US 2024/0089455 A1  Mar. 14, 2024

Related U.S. Application Data

(63) Continuation of application No. 17/611,466, filed as application No. PCT/KR2020/006432 on May 15, 2020, now Pat. No. 11,863,754.

(30) Foreign Application Priority Data

May 15, 2019 (KR) .................... 10-2019-0056974
May 15, 2020 (KR) .................... 10-2020-0058335

(51) Int. Cl.
H04N 19/132 (2014.01)
H04N 19/176 (2014.01)
(Continued)

(52) U.S. Cl.
CPC ......... *H04N 19/132* (2014.11); *H04N 19/176* (2014.11); *H04N 19/186* (2014.11); *H04N 19/70* (2014.11)

(58) Field of Classification Search
CPC .. H04N 19/132; H04N 19/176; H04N 19/186; H04N 19/70
(Continued)

(56) References Cited

U.S. PATENT DOCUMENTS

2006/0146191 A1   7/2006  Kim et al.
2006/0233251 A1* 10/2006  Kim ..................... H04N 19/107
                                                              375/240.12

(Continued)

FOREIGN PATENT DOCUMENTS

CN    101057506 A    10/2007
CN    105247866 A     1/2016
(Continued)

OTHER PUBLICATIONS

Notification of First Office Action for Chinese Patent Application No. 2020800427797 from China National Intellectual Property Administration, dated May 8, 2024, 15 pages.

*Primary Examiner* — Dominic D Saltarelli
(74) *Attorney, Agent, or Firm* — Fox Rothschild LLP

(57) ABSTRACT

A method and for reconstructing chroma blocks and a video decoding apparatus are disclosed. In accordance with one aspect of the present disclosure, provided is a method for reconstructing a chroma block of a target block to be reconstructed. The method includes decoding correlation information between first residual samples and second
(Continued)

residual samples, the first residual sample, and prediction information of the chroma block from a bitstream, wherein the first residual samples are residual samples of a first chroma component and the second residual samples are residual samples of a second chroma component. The method further includes generating predicted samples of the first chroma component and predicted samples of the second chroma information on the basis of the prediction information, and deriving the second residual samples by applying the correlation information to the first residual samples. The method further includes reconstructing a chroma block of the first chroma component by adding the first residual samples and the predicted samples of the first chroma component and reconstructing a chroma block of the second chroma component by adding the second residual samples and predicted samples of the second chroma component.

9 Claims, 16 Drawing Sheets

(51) Int. Cl.
*H04N 19/186* (2014.01)
*H04N 19/70* (2014.01)

(58) Field of Classification Search
USPC .................................................. 375/240.02
See application file for complete search history.

(56) References Cited

U.S. PATENT DOCUMENTS

| | | |
|---|---|---|
| 2007/0014478 A1 | 1/2007 | Birinov et al. |
| 2008/0008239 A1 | 1/2008 | Song |
| 2011/0158521 A1 | 6/2011 | Park et al. |
| 2011/0211757 A1 | 9/2011 | Kim et al. |
| 2013/0182761 A1 | 7/2013 | Chen et al. |
| 2014/0348240 A1 | 11/2014 | Kim et al. |
| 2015/0124865 A1 | 5/2015 | Kim et al. |
| 2016/0255359 A1 | 9/2016 | Yu et al. |
| 2016/0323581 A1 | 11/2016 | Zhang et al. |
| 2017/0251213 A1 | 8/2017 | Ye et al. |
| 2018/0014023 A1 | 1/2018 | Lim et al. |
| 2019/0020875 A1 | 1/2019 | Liu et al. |
| 2020/0260096 A1* | 8/2020 | Ikai ........................ H04N 19/96 |
| 2021/0211738 A1 | 7/2021 | Yin et al. |
| 2021/0289230 A1 | 9/2021 | Heo et al. |
| 2021/0297680 A1 | 9/2021 | Wang et al. |
| 2021/0368172 A1 | 11/2021 | Lim et al. |

FOREIGN PATENT DOCUMENTS

| | | |
|---|---|---|
| CN | 105723707 A | 6/2016 |
| CN | 105981381 A | 9/2016 |
| KR | 10-2006-0079051 A | 7/2006 |
| KR | 10-2007-0009336 A | 1/2007 |
| KR | 10-2011-0078498 A | 7/2011 |
| KR | 10-2012-0061035 A | 6/2012 |
| KR | 10-2015-0048637 A | 5/2015 |
| WO | 2019/066384 A1 | 4/2019 |

* cited by examiner

METHOD FOR RECONSTRUCTING CHROMA BLOCK AND VIDEO DECODING APPARATUS

CROSS-REFERENCE TO RELATED APPLICATION

This application is a continuation of U.S. patent application Ser. No. 17/611,466, filed on Nov. 15, 2021, which is a National Phase application filed under 35 USC 371 of PCT International Application No. PCT/KR2020/006432 with an International Filing Date of May 15, 2020, which claims under 35 U.S.C. § 119 (a) the benefit of Korean Patent Application No. 10-2019-0056974, filed on May 15, 2019, and Korean Patent Application No. 10-2020-0058335, filed on May 15, 2020, the entire contents of which are incorporated herein by reference.

TECHNICAL FIELD

The present invention relates to encoding and decoding of a video, more particularly, to a method for reconstructing a chroma block and a video decoding apparatus, which improve encoding and decoding efficiency by efficiently predicting residual samples of a chroma component.

BACKGROUND ART

Since video data has a large data volume compared to audio data or still image data, it requires a lot of hardware resources, including memory, to store or transmit the data in its raw form before undergoing a compression process.

Accordingly, storing or transmitting video data typically accompanies compression thereof by using an encoder before a decoder can receive, decompress, and reproduce the compressed video data. Existing video compression technologies include H.264/AVC and High Efficiency Video Coding (HEVC), which improves the encoding efficiency of H.264/AVC by about 40%.

However, the constant increase of video images in size, resolution, and frame rate and the resultant increase of data amount to be encoded require a new and superior compression technique with better encoding efficiency and higher image quality improvement over existing compression techniques.

DISCLOSURE

Technical Problem

In view of this needs, the present invention is directed to providing an improved video encoding and decoding technique. In particular, an aspect of the present invention is related to a technique for improving encoding and decoding efficiency by deriving the other from one of a Cb chroma component and a Cr chroma component.

Technical Solution

In accordance with one aspect of the present disclosure, provided is a method for reconstructing a chroma block of a target block to be reconstructed. The method includes decoding correlation information between first residual samples and second residual samples, the first residual sample, and prediction information of the chroma block from a bitstream, wherein the first residual samples are residual samples of a first chroma component and the second residual samples are residual samples of a second chroma component. The method further includes generating predicted samples of the first chroma component and predicted samples of the second chroma information on the basis of the prediction information, and deriving the second residual samples by applying the correlation information to the first residual samples. The method further includes reconstructing a chroma block of the first chroma component by adding the first residual samples and the predicted samples of the first chroma component and reconstructing a chroma block of the second chroma component by adding the second residual samples and predicted samples of the second chroma component.

In accordance with another aspect of the present disclosure, provided is a video decoding apparatus for reconstructing a chroma block of a target block to be reconstructed. The video decoding apparatus comprises a decoding unit configured to decode correlation information between first residual samples and second residual samples, the first residual samples, and prediction information of the chroma block from a bitstream, wherein the first residual samples are residual samples of a first chroma component and the second residual samples are residual samples of a second chroma component. The video decoding apparatus further comprises a prediction unit configured to generate predicted samples of the first chroma component and predicted samples of the second chroma information on the basis of the prediction information, a chroma component reconstruction unit configured to derive the second residual samples by applying the correlation information to the first residual samples. The video decoding apparatus further comprises an adder configured to reconstruct a chroma block of the first chroma component by adding the first residual samples and the predicted samples of the first chroma component and reconstruct a chroma block of the second chroma component by adding the second residual samples and predicted samples of the second chroma component.

Advantageous Effects

As described above, according to some embodiments of the present invention, since either one of a Cb chroma component and a Cr chroma component is derived without being signaled, the compression performance of encoding and decoding is improved.

DETAILED DESCRIPTION

Figure 1:
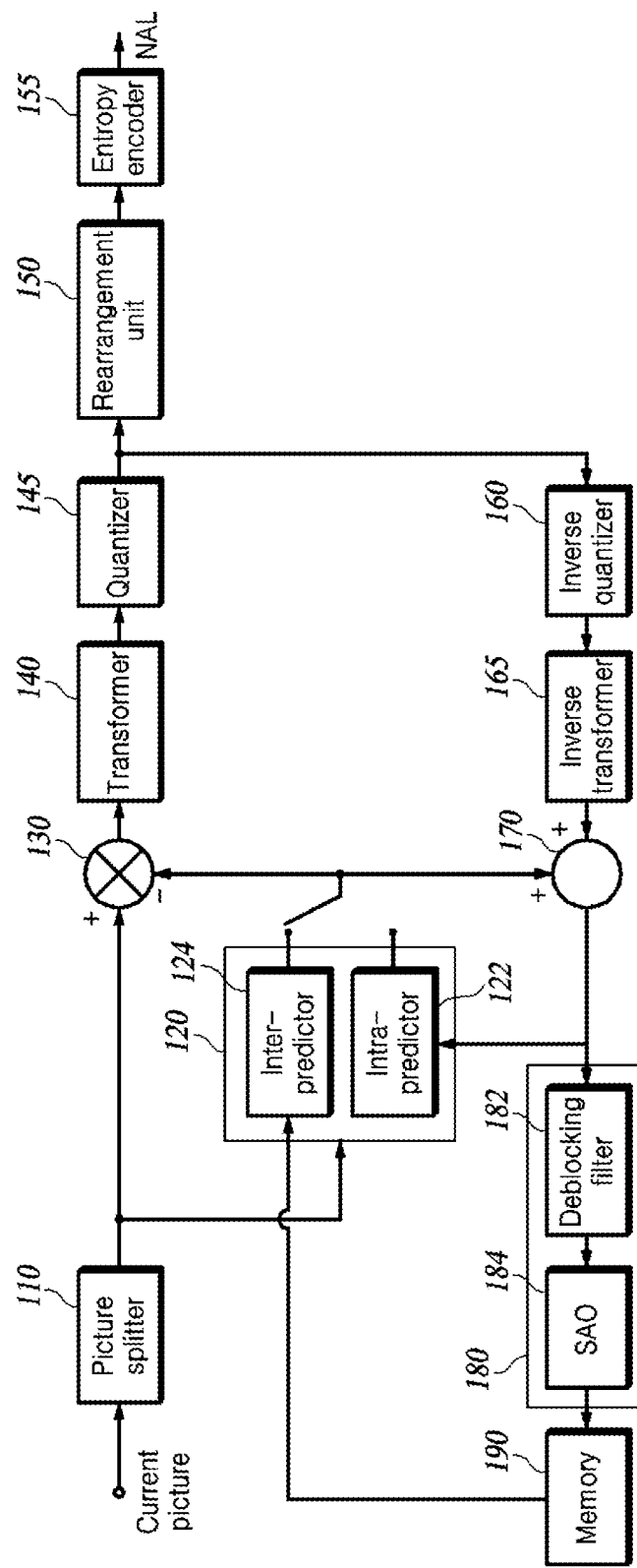
FIG. 1 is a block diagram illustrating a video encoding apparatus that can implement the techniques of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

FIG. 1 is a block diagram illustrating a video encoding apparatus that can implement the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture param-eter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 determines the size of a coding tree unit (CTU). Information about the size of the CTU (CTU size) is encoded as a syntax of the SPS or PPS and is transmitted to the video decoding apparatus.

The picture splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
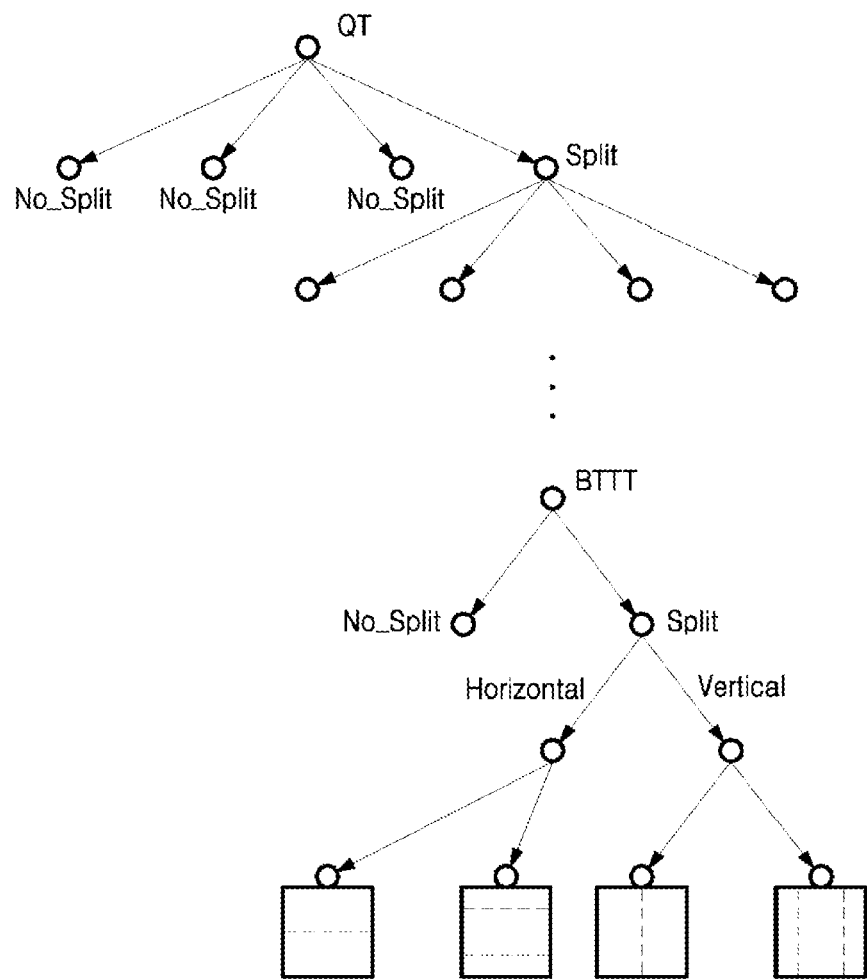
FIG. 2 is a diagram for explaining a method of splitting a block by using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus.

Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag)

indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 predicts the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

Figure 3A:
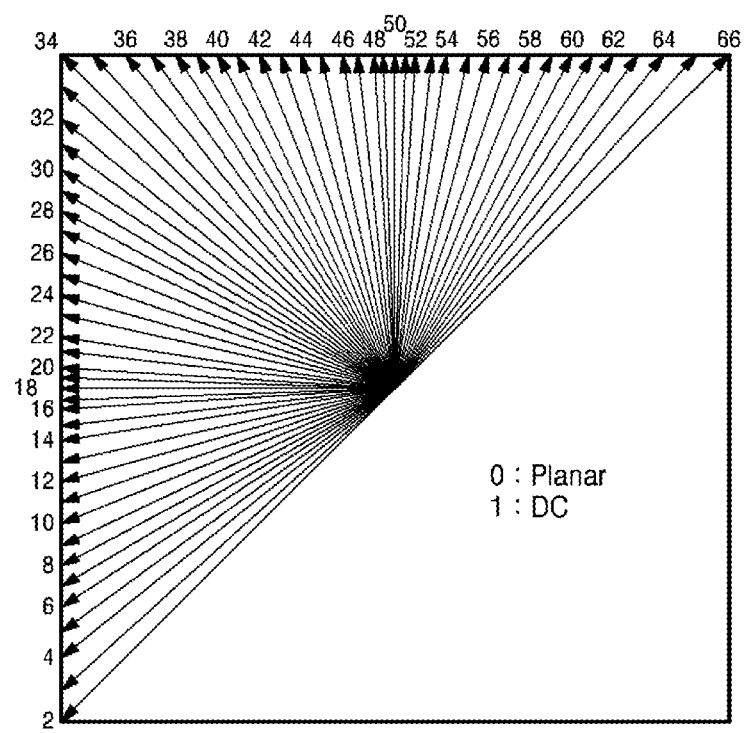
FIG. 3A is a diagram illustrating a plurality of intra-prediction modes.

The intra-prediction unit 122 predicts pixels in the current block using pixels (reference pixels) positioned around the current block in the current picture including the current block. There is a plurality of intra-prediction modes according to the prediction directions. For example, as shown in FIG. 3A, the plurality of intra-prediction modes may include two non-directional modes, which include a planar mode and a DC mode, and 65 directional modes. Neighboring pixels and an equation to be used are defined differently for each prediction mode. The table below lists intra-prediction mode numbers and names thereof.

Figure 3B:
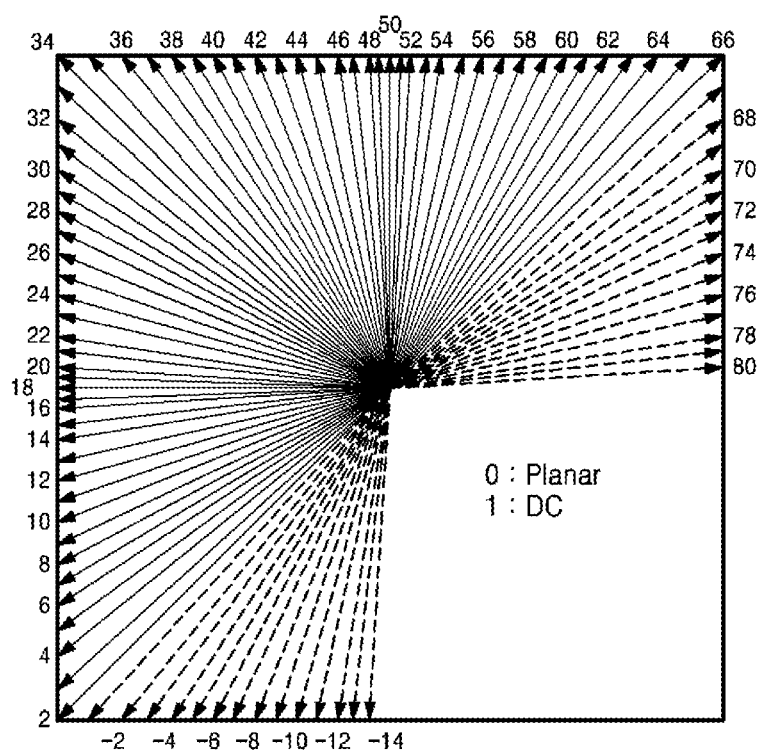
FIG. 3B is a diagram illustrating a plurality of intra-prediction modes including wide-angle intra-prediction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of the width and height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with width greater than the height thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

The inter-predictor 124 generates a prediction block for the current block through motion compensation. The inter-predictor 124 searches for a block most similar to the current block in a reference picture which has been encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 subtracts the prediction block generated by the intra-predictor 122 or the inter-predictor 124 from the current block to generate a residual block.

The transformer 140 partitions the residual block into one or more transform blocks, performs a transforms on the transform blocks, and transforms the residual values of the transform blocks from a pixel domain into a frequency domain. In the frequency domain, the transform blocks are referred to as coefficient blocks containing one or more transform coefficient values. A two-dimensional (2D) transform kernel may be used for the transform, and a one-dimensional (1D) transform kernel may be used for each of horizontal transform and vertical transform. The transform kernels may be based on a discrete cosine transform (DCT), a discrete sine transform (DST), or the like.

The transformer 140 may transform the residual signals in a residual block by using the entire size of the residual block as a transform unit. Also, the transformer 140 may partition the residual block into two sub-blocks in a horizontal or vertical direction and may perform the transform on only one of the two sub-blocks. Accordingly, the size of the transform block may be different from the size of the residual block (and thus the size of a prediction block). Non-zero residual sample values may be absent or very sparse in untransformed sub-block. Residual samples of the untransformed sub-block may not be signaled and may all be regarded as "0" by a video decoding apparatus. Several partition types may be present depending on a partitioning direction and a partitioning ratio. The transformer 140 may provide information on a coding mode (or a transform mode) of the residual block (e.g., the information on the coding mode includes information indicating whether the residual block is transformed or the sub-block of the residual block is transformed, information indicating a partition type selected to partition the residual block into the sub-blocks, information for identifying the sub-block to be transformed, etc.) to the entropy encoder 155. The entropy encoder 155 may encode the information on a coding mode (or a transform mode) of a residual block.

The quantizer 145 quantizes transform coefficients output from the transformer 140 and outputs quantized transform coefficients to the entropy encoder 155. The quantizer 145 may directly quantize a related residual block for a certain block or frame without transform.

The rearrangement unit 150 may perform rearrangement of the coefficient values with the quantized transform coefficients. The rearrangement unit 150 may use coefficient scanning for changing the two-dimensional coefficient array into a one-dimensional coefficient sequence. For example, the rearrangement unit 150 may scan coefficients from a DC coefficient toward coefficients in a high-frequency region through a zig-zag scan or a diagonal scan to output a one-dimensional coefficient sequence. Depending on the size of the transform unit and the intra-prediction mode, the zig-zag scan used may be replaced by a vertical scan for scanning the two-dimensional coefficient array in a column direction and a horizontal scan for scanning the two-dimensional block shape coefficients in a row direction. In other words, a scanning method to be used may be determined among a zig-zag scan, a diagonal scan, a vertical scan, and a horizontal scan according to the size of the transform unit and the intra-prediction mode.

The entropy encoder 155 encodes a sequence of the one-dimensional quantized transform coefficients outputted from the rearrangement unit 150 by using various encoding methods such as Context-based Adaptive Binary Arithmetic Code (CABAC), Exponential Golomb, and the like, encoding to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction, and encodes intra-prediction information (i.e., information about an intra-prediction mode) or inter-prediction information (information about a reference picture index and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The filter unit 180 filters the reconstructed pixels to reduce blocking artifacts, ringing artifacts, and blurring artifacts generated due to block-based prediction and transform/quantization. The filter unit 180 may include a deblocking filter 182 and a pixel adaptive offset (SAO) filter 184.

The deblocking filter 180 filters the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
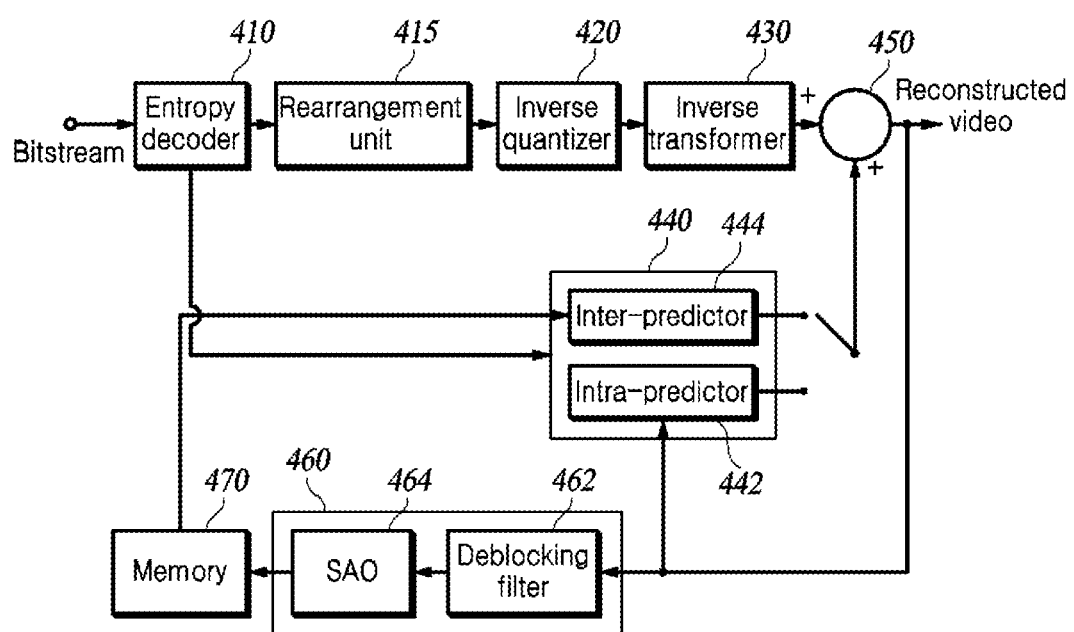
FIG. 4 is a block diagram illustrating a video decoding apparatus that can implement the techniques of the present disclosure.

FIG. 4 is an exemplary functional block diagram of a video decoding apparatus capable of implementing the techniques of the present disclosure. Hereinafter, the video decoding apparatus and its components will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 determines a current block to be decoded by decoding a bitstream generated by the video encoding apparatus and extracting information related to block splitting, and extracts prediction information and information about a residual signal, and the like required to reconstruct the current block.

The entropy decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 extracts information about a prediction type indicating whether the current block is intra-predicted or inter-predicted. When the prediction type information indicates intra-prediction, the entropy decoder 410 extracts a syntax element for the intra-prediction information (intra-prediction mode) for the current block. When the prediction type information indicates inter-prediction, the entropy decoder 410 extracts a syntax element for the inter-prediction information, that is, information indicating a motion vector and a reference picture referred to by the motion vector.

Meanwhile, the entropy decoder 410 extracts the information on a coding mode of a residual block (e.g., information on whether a residual block is encoded or only a sub-block of a residual block is encoded, information indicating a partition type selected to partition a residual bock into sub-blocks, information for identifying encoded residual sub-blocks, quantization parameters, etc.) from a bitstream. Also, the entropy decoder 410 extracts information on quantized transform coefficients of the current block as information regarding a residual signal.

The rearrangement unit 415 may change the sequence of the quantized ID transform coefficients entropy-decoded by the entropy decoder 410 back into a 2D array of coefficients (i.e., a block) in the reverse order of coefficient scanning performed by the video encoding apparatus.

The inverse quantizer 420 inversely quantizes the quantized transform coefficients, and the inverse transformer 430 generates a reconstructed residual block for the current block by reconstructing residual signals by inversely transforming the inversely quantized transform coefficients from a frequency domain to a spatial domain on the basis of the information on a coding mode of a residual block.

When the information on a coding mode of a residual block indicates that a residual block of the current block is encoded in the video encoding apparatus, the inverse transformer 430 generates a reconstructed residual block for the current block by performing inverse transform on the inversely quantized transform coefficients using the size of the current block (and thus the size of a residual block to be restored) as a transform unit.

Also, when the information on a coding mode of a residual block indicates that only one sub-block of a residual block is encoded in the video encoding apparatus, the inverse transformer 430 generates a reconstructed residual block for the current block by reconstructing residual signals for a transformed sub-block through inverse transform on the inversely quantized transform coefficients using the size of the transformed sub-block as a transform unit and by setting residual signals for an untransformed sub-block to "0."

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on the syntax element for the intra-prediction mode extracted from the entropy decoder 410, and predicts the current block using the reference pixels around the current block according to the intra-prediction mode.

The inter-predictor 444 determines a motion vector of the current block and a reference picture referred to by the motion vector using the syntax element for the inter-prediction mode extracted from the entropy decoder 410, and predicts the current block based on the motion vector and the reference picture.

The adder 450 reconstructs the current block by adding the residual block output from the inverse transformer 430 and the prediction block output from the inter-predictor 444 or the intra-predictor 442. The pixels in the reconstructed current block are used as reference pixels in intra-predicting a block to be decoded next.

The filter unit 460 may include a deblocking filter 462 and an SAO filter 464. The deblocking filter 462 deblocking-filters the boundary between the reconstructed blocks to remove blocking artifacts caused by block-by-block decoding. The SAO filter 464 performs additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

In a conventional video encoding/decoding method, in order to reduce the complexity of prediction of chroma components, each of the chroma components is predicted in the same manner as a prediction process for a luma component, or each of the chroma components is predicted in a simplified way of the prediction process for the luma component. However, such a conventional method has a problem in that color distortion occurs.

The present disclosure proposes encoding and decoding methods for effectively predicting a chroma component in a chroma block of a target block to be reconstructed (i.e., a current block).

The methods proposed herein are methods in which information on residual samples (or residual signals) of one of a Cb chroma component and a Cr chroma component is coded and signaled, and information on residual samples of the other one is derived without being coded and signaled.

Herein, residual samples of a chroma component to be derived may be referred to as "second residual samples of a second chroma component", and residual samples of a chroma component to be coded and signaled to derive the second residual samples may be referred to as "first residual samples of a first chroma component".

The first chroma component may be one of the Cb chroma component and the Cr chroma component, and the second chroma component may be the other of the Cb chroma component and the Cr chroma component. For example, when the residual samples of the Cb chroma component are coded and signaled and the residual samples of the Cr chroma component are derived, the residual samples of the Cb chroma component may be referred to as first residual samples, and the residual samples of the Cr chroma component may be referred to as second residual samples. As another example, when the residual samples of the Cr chroma component are coded and signaled and the residual samples of the Cb chroma component are derived, the residual samples of the Cr chroma component may be referred to as first residual samples, and the residual samples of the Cb chroma component may be referred to as second residual samples.

A method of deriving the second residual samples may be classified into 1) embodiments in which information on a correlation between the first residual samples and the second residual samples is used, 2) embodiments in which whether to activate or apply a second-residual-sample derivation scheme is determined, and the like. Also, the embodiments in which the correlation information is used may be classified into different embodiments depending on whether an inter-chroma difference value is used. Hereinafter, terms used herein will be defined first, and then each embodiment will be described in detail.

Correlation Information

Correlation information refers to information for deriving second residual samples from first residual samples and may be adaptively determined according to the range of a luma component value of the current block to be encoded. The correlation information may include multiplication information or may include multiplication information and offset information.

The correlation information may be defined at various positions in a bitstream and signaled to a video decoding apparatus and may be decoded from the positions in the bitstream. For example, the correlation information may be defined and signaled at one or more positions among high-level syntaxes (HLS) such as SPS, PPS, and picture level. As another example, the correlation information may be signaled at a lower level such as a tile group level, a tile level, a CTU level, a unit block level (CU, TU, PU), and the like. As another example, a difference value (difference correlation information) with correlation information signaled through HLS may be signaled at a lower level.

According to an embodiment, the correlation information may not be directly signaled, but some information from which the correlation information can be derived in the video decoding apparatus may be signaled. For example, table information including fixed values for the correlation information may be signaled, and an index value indicating correlation information used to derive a second residual sample among the fixed values in the table information may be signaled. As another example, the table information may not be signaled, but may be predefined between a video encoding apparatus and a video decoding apparatus. The index value may be defined and signaled at one or more of a tile group level, a tile level, and a unit block level.

The correlation information is information used to derive a second residual sample and thus may be signaled when the derivation of a second residual sample is applied. Accordingly, the correlation information may be decoded from the bitstream when a first syntax element, which will be described below, indicates that the derivation of the second residual sample is allowed or may be decoded from the bitstream when a second syntax element, which will be described below, indicates that the derivation of the second residual same is applied.

Multiplication Information

Multiplication information refers to information for indicating a multiplication factor between the first residual samples and the second residual samples. When the multiplication factor is applied to (a value of) the first residual sample, a value equal to (a value of) the second residual sample or a value within a range corresponding to the second residual sample may be derived. The multiplication factor may represent a scaling relationship, a weight relationship, a sign relationship, etc., between the first residual samples and the second residual samples. Accordingly, the multiplication factor may be an integer such as −1 or 1 or a fraction such as ½ or −½.

When the multiplication information is signaled in the form of a flag of 0 or 1 and the multiplication factor represents the sign relationship between the first residual samples and the second residual samples, the multiplication information may represent the multiplication factor through the method shown in Equation 1.

$$\text{Multiplication Factor} = 1 - 2 \cdot (\text{Multiplication Information})$$ [Equation 1]

Multiplication Information (i.e., a flag) equal to 0 indicates that the first residual samples and the second residual samples have the same sign relationship, and a multiplication factor of "1" may be applied to the first residual samples. Multiplication Information (i.e., a flag) equal to 1 indicates that the first residual samples and the second residual samples have different sign relationships, and a multiplication factor of "−1" may be applied to the first residual samples.

Offset Information

Offset information refers to information for indicating an offset factor between the first residual sample (to which the multiplication factor is applied) and the second residual sample. When the offset factor is applied to the first residual sample to which the multiplication factor is applied, a value equal to the second residual sample or a value within a range corresponding to the second residual sample may be derived. The offset factor may be an integer such as −1, 0, or 1 or a fraction such as ½ or −½.

In relation to the case of an offset factor equal to 0, the offset information may not be signaled if only multiplication information is included in the correlation information, and the offset information may indicate that the offset factor equals to 0 if the multiplication information and the offset information are included in the correlation information.

Inter-chroma Difference Value

An inter-chroma difference value refers to a difference value between the first residual sample and the second residual sample (i.e., refers to a value obtained by subtraction between the first residual sample and the second residual sample). More specifically, the inter-chroma difference value corresponds to a value derived by subtraction between the first residual sample to which the correlation information is applied and the second residual sample. For example, if the correlation information includes only the multiplication information, the inter-chroma difference value may be derived by performing subtraction between the first residual sample to which the multiplication factor is applied and the second residual sample. As another example, if the correlation information includes the multiplication information and the offset information, the inter-chroma difference value may be derived by performing subtraction between the first residual sample to which the multiplication factor and the offset factor are applied and the second residual sample.

Embodiment 1

Embodiment 1 is a method of using both correlation information and inter-chroma difference values. Embodiment 1 may be divided into the following sub-embodiments, depending on a step of the encoding steps at which a process of deriving inter-chroma difference values and correlation information is performed and depending on a step of the decoding steps at which a process of deriving second residual samples is performed.

Embodiment 1-1

In Embodiment 1-1, a process of deriving inter-chroma difference values and correlation information is performed before a step of transforming residual samples, and a process of deriving second residual samples is performed after a step of inversely transforming residual samples.

Figure 5:
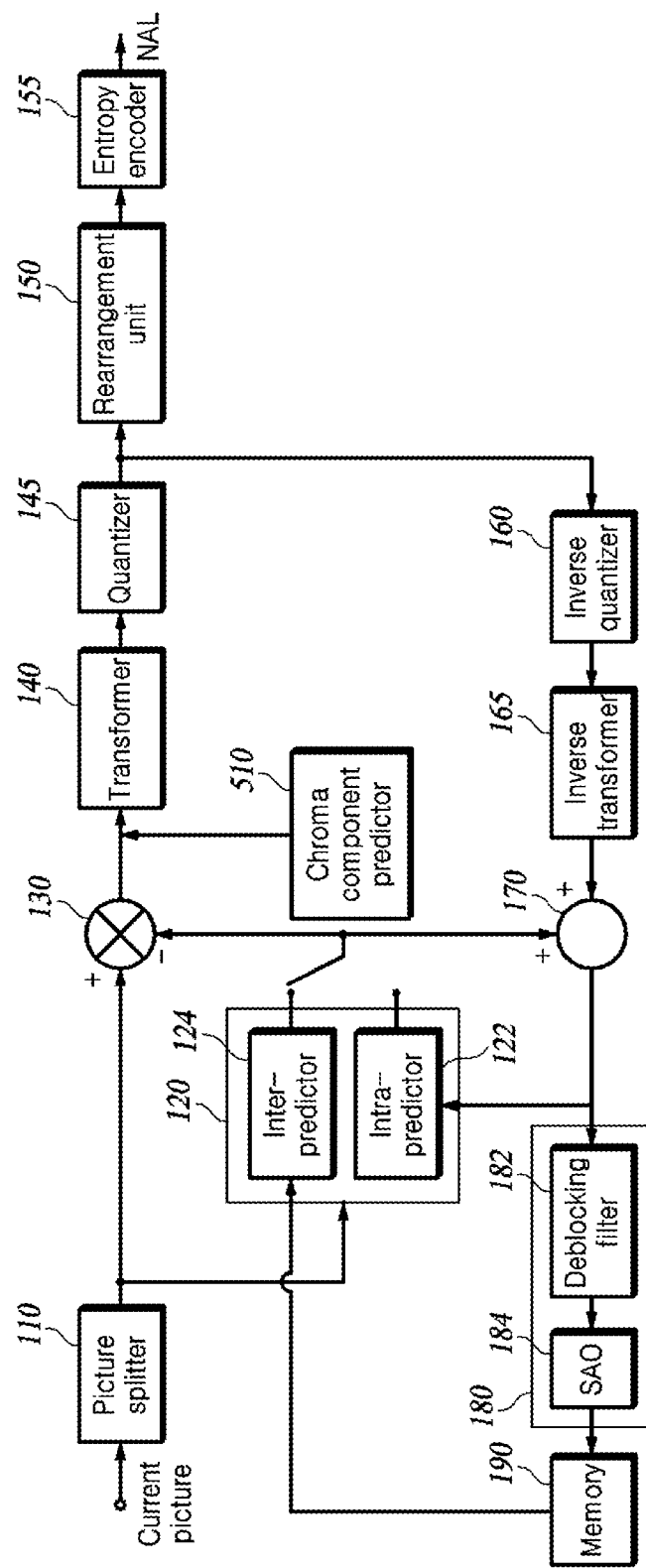
FIG. 5 is an exemplary block diagram of a video encoding apparatus can implement an example of a residual block reconstruction method for chroma components.
Figure 6:
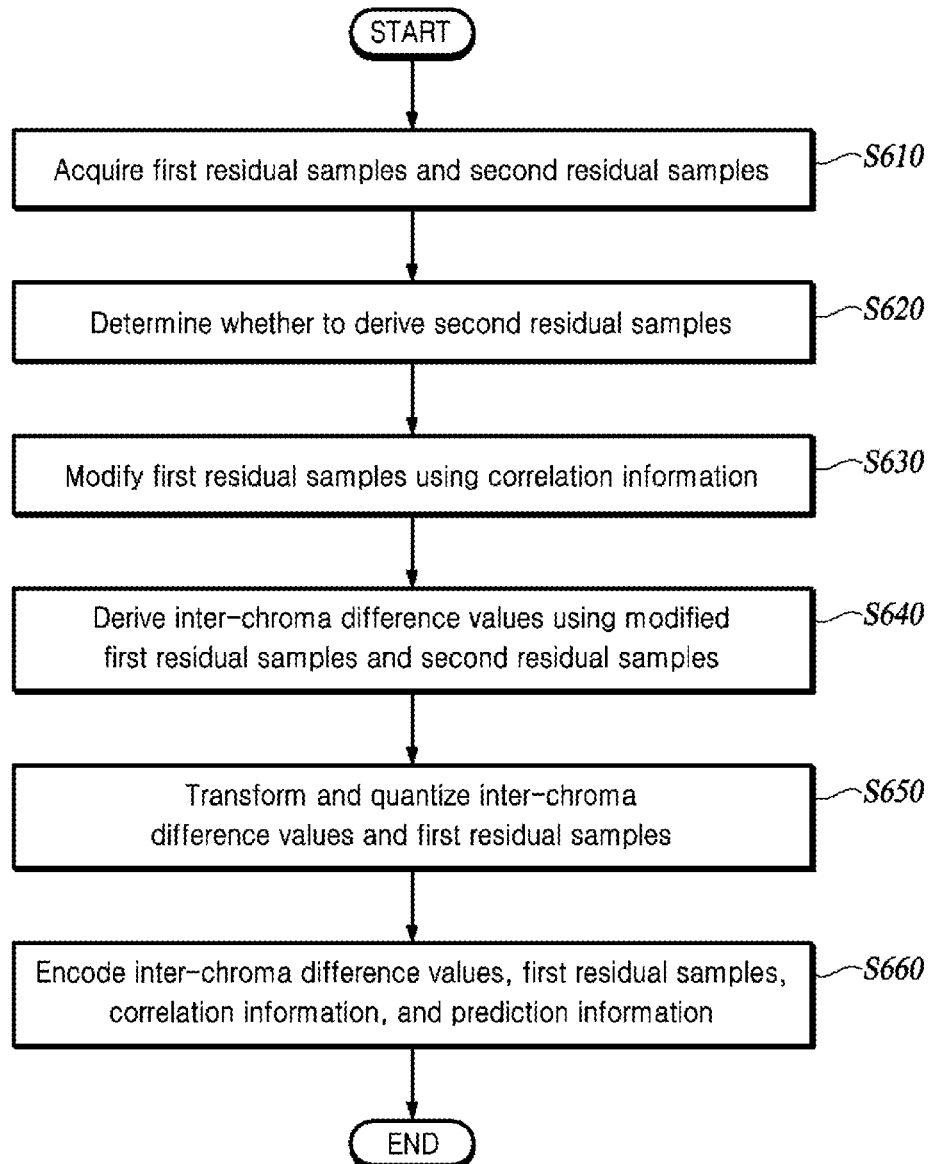
FIG. 6 is a flowchart illustrating an example of a residual block reconstruction method for chroma components implemented in the video encoding apparatus of FIG. 5.
Figure 7:
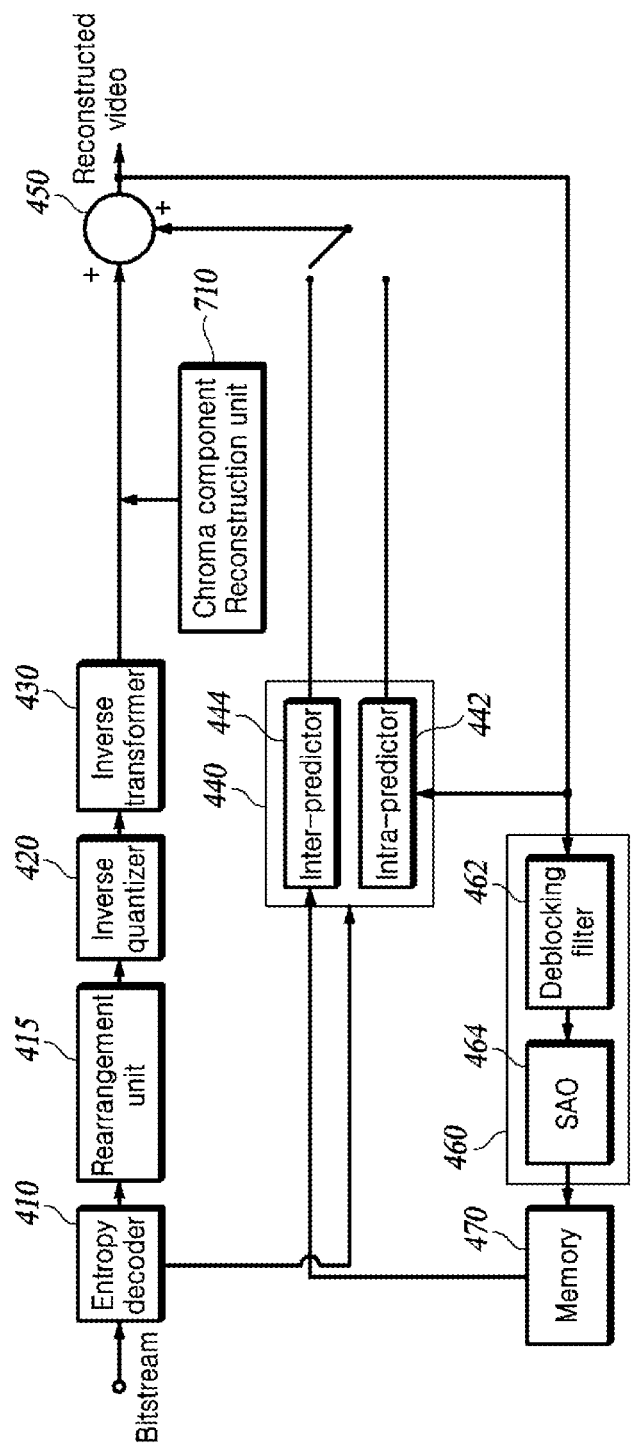
FIG. 7 is a block diagram illustrating a video decoding apparatus that can implement an example of a residual block reconstruction method for chroma components.
Figure 8:
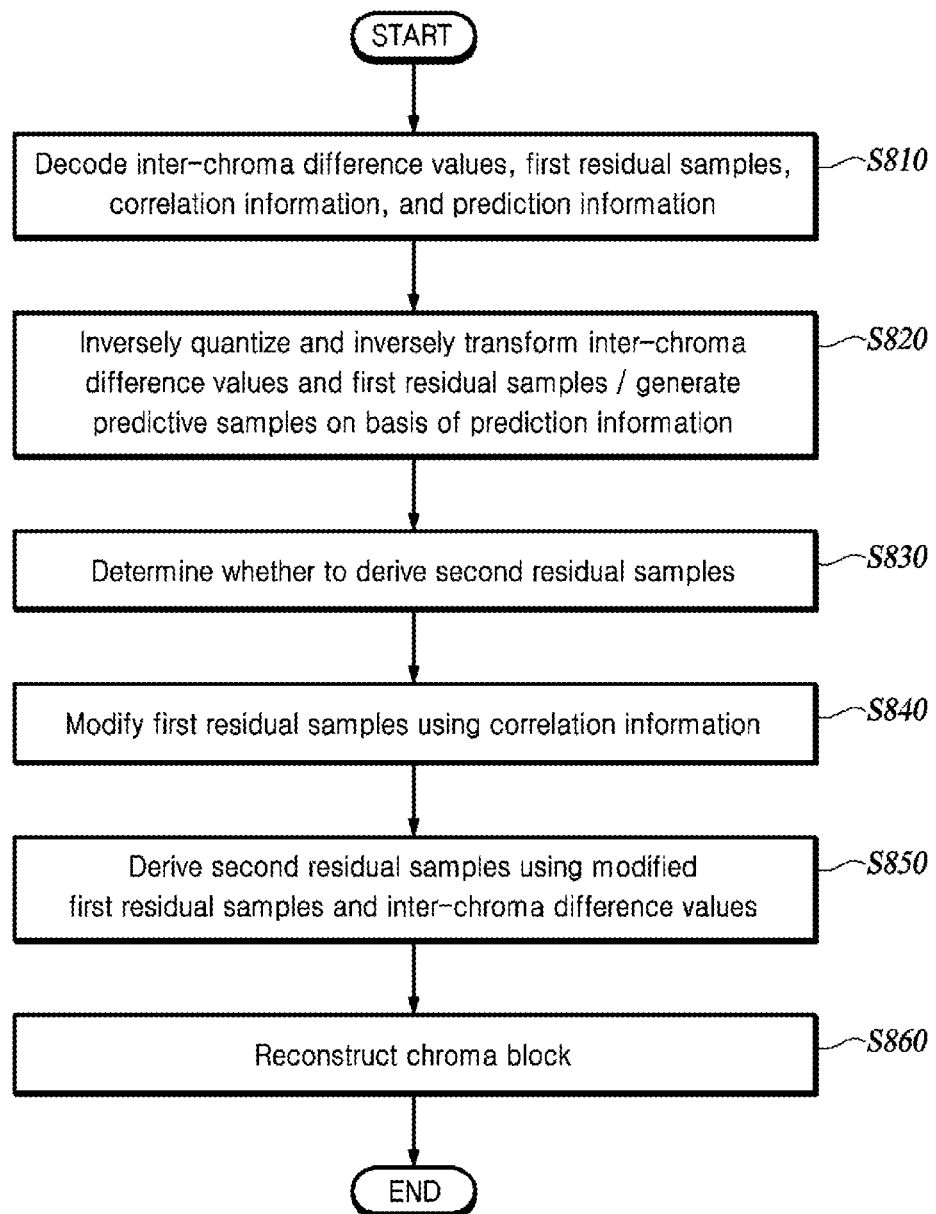
FIG. 8 is a flowchart illustrating an example of a residual block reconstruction method for chroma components implemented in the video decoding apparatus of FIG. 7.

An exemplary block diagram and flowchart of a video encoding apparatus for performing Embodiment 1-1 are shown in FIGS. 5 and 6, respectively, and an exemplary block diagram and flowchart of a video decoding apparatus for performing Embodiment 1-1 are shown in FIGS. 7 and 8, respectively.

A subtractor 130 may obtain the first residual samples and the second residual samples (S610). Specifically, the first residual samples may be obtained by subtracting between a prediction block (or predicted samples) of a first chroma component and a chroma block of the first chroma component, and the second residual samples may be obtained by subtracting a prediction block of a second chroma component and a chroma block of the second chroma component. The prediction blocks of the chroma components may be derived through prediction of a predictor 120, and information used for the prediction, i.e., prediction information may be derived in this process. The process of generating predicted samples and the process of deriving prediction information may be equally applied to other embodiments of the present specification.

A chroma component predictor 510 may determine whether to derive the second residual samples from the first residual samples (S620).

The chroma component predictor 510 may determine, for the chroma blocks, one of a method in which both the first residual samples and the second residual samples are coded (i.e., a general method) and a method in which the second residual samples is derived (i.e., a second-residual-sample derivation method). For example, the chroma component predictor 510 calculates rate-distortion values through rate-distortion analysis on the general method and the derivation method, and may select or determine one method having the best rate-distortion characteristics for the chroma blocks. The process of determining whether to derive the second residual samples may be equally applied to other embodiments of the present specification.

The chroma component predictor 510 may modify the first residual samples when the second-residual-sample derivation method (i.e., the method in which the second residual samples are derived) is selected for the chroma blocks (S630). The modification of the first residual samples may be achieved by applying the correlation information to the first residual samples.

The chroma component predictor 510 may derive inter-chroma difference values using the modified first residual samples and the second residual samples (S640). The inter-chroma difference value may be derived by subtracting the modified first residual sample and the second residual sample.

Operation S630 and operation S640 may be performed through Equation 2 below.

$$Cro\_r = Cro\_resi2 - (W*Cro\_resi1 + Offset) \qquad \text{[Equation 2]}$$

In Equation 2, Cro_resi1 denotes first residual sample, Cro_resi2 denotes a second residual sample, Cro_r denotes an inter-chroma difference value, W denotes a multiplication factor, and Offset denotes an offset factor. Referring back to Equation 2 focusing on the second residual sample, Cro_resi2 may be a primary signal of the second residual sample (i.e., a primary residual signal of the second chroma component), and Cro_r may be a secondary signal of the second residual sample (i.e., a secondary residual signal of the second chroma component).

The transformer 140 may transform the inter-chroma difference values and the first residual samples, and the quantizer 145 may quantize the transformed inter-chroma difference values and the transformed first residual samples (S650). Here, the inter-chroma difference values may be quantized through a "quantization parameter that is changed using QP_C_offset" from a quantization parameter of the first residual samples or the luma component. QP_C_offset may be determined by various methods. For example, QP_C_offset may be adaptively determined according to one or more of the range of a luma component value (the range of a brightness value), the size of a chroma block, and the ranges of quantization parameters of a luma component. As another example, QP_C_offset may be determined as a value preset in a video encoding apparatus and a video decoding apparatus. As another example, the video encoding apparatus may determine QP_C_offset as an arbitrary value, perform a quantization process, and signal a value of QP_C_offset used in the quantization process to the video decoding apparatus. The quantization method using QP_C_offset may also be applied to other embodiments of the present specification.

The transformed and quantized inter-chroma difference values, first residual samples, correlation information, and prediction information may be encoded and signaled to the video decoding apparatus (S660). Here, the second residual samples are not signaled.

The entropy decoder 410 may decode the inter-chroma difference values, the first residual samples, the correlation information, and the prediction information from a bitstream (S810). The inverse quantizer 420 inversely quantizes the inter-chroma difference values and the first residual samples, and the inverse transformer 430 may inversely transform the inversely quantized inter-chroma difference values and the inversely quantized first residual samples (S820).

The predictor 440 may generate (or reconstruct) the predicted samples (or predictive block) of the first chroma component and the predicted samples of the second chroma component on the basis of the prediction information (S820).

A chroma component reconstruction unit 710 may determine whether to derive the second residual samples from the first residual samples (whether to activate (allow) and/or apply the second-residual-sample derivation method) (S830). A detailed description of operation S830 will be described below through a separate embodiment.

The chroma component reconstruction unit 710 may modify the first residual samples using the (inversely transformed) correlation information when it is determined to derive the second residual samples (S840). Also, the chroma component reconstruction unit 710 may derive the second residual samples using the modified first residual samples and the inversely transformed inter-chroma difference values (S850). The second residual samples may be derived by adding the modified first residual samples and the inversely transformed inter-chroma difference values.

Operation S630 and operation S640 may be performed through Equation 3 below.

$$Cro\_resi2 = (W*Cro\_resi1 + Offset) + Cro\_r \qquad \text{[Equation 3]}$$

The adder 450 may reconstruct the chroma block of the first chroma component by adding the first residual samples and the prediction block of the first chroma component and may reconstruct the chroma block of the second chroma component by adding the derived second residual samples and the prediction block of the second chroma component (S860).

Embodiment 1-2

In Embodiment 1-2, a process of deriving the inter-chroma difference values and correlation information is performed after a step of quantizing residual samples, and a process of deriving the second residual samples is performed before a step of inversely quantizing residual samples.

Figure 9:
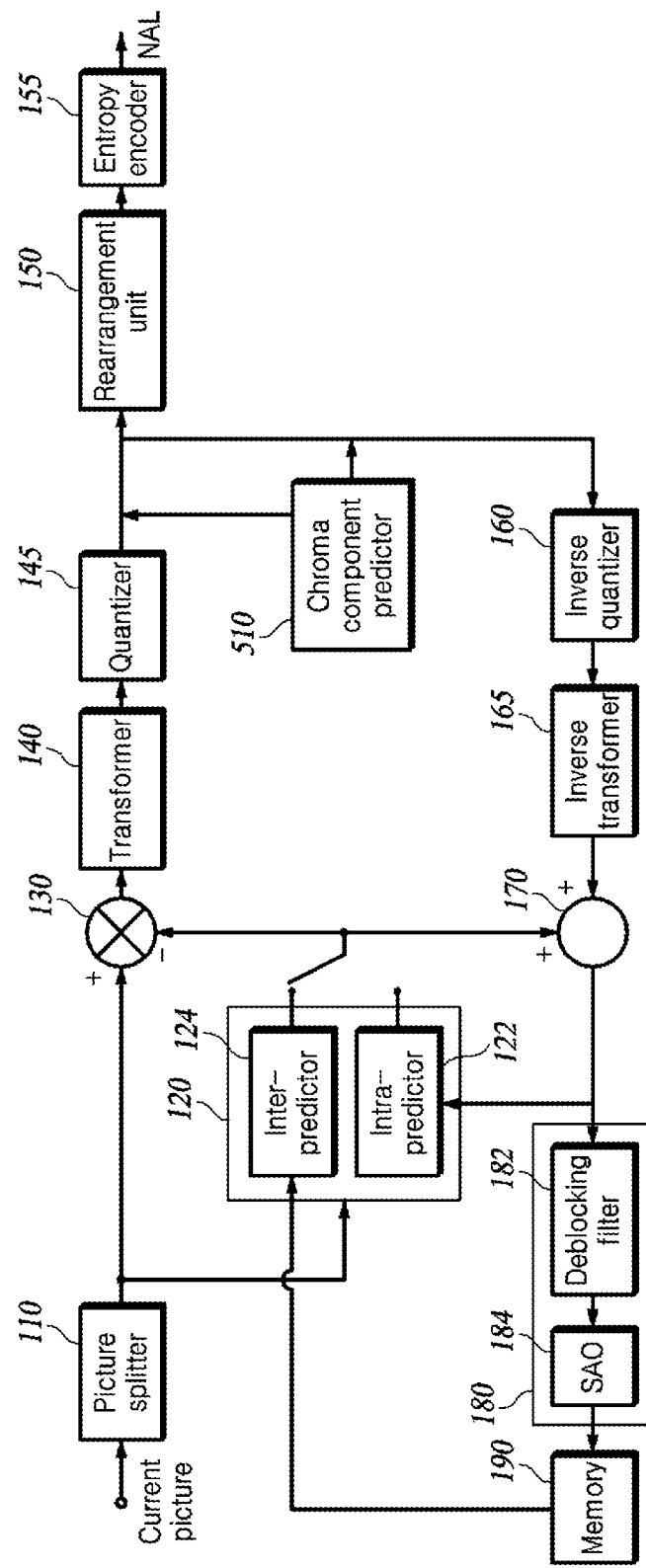
FIG. 9 is an exemplary block diagram of a video encoding apparatus capable of implementing another example of a residual block reconstruction method for chroma components.
Figure 10:
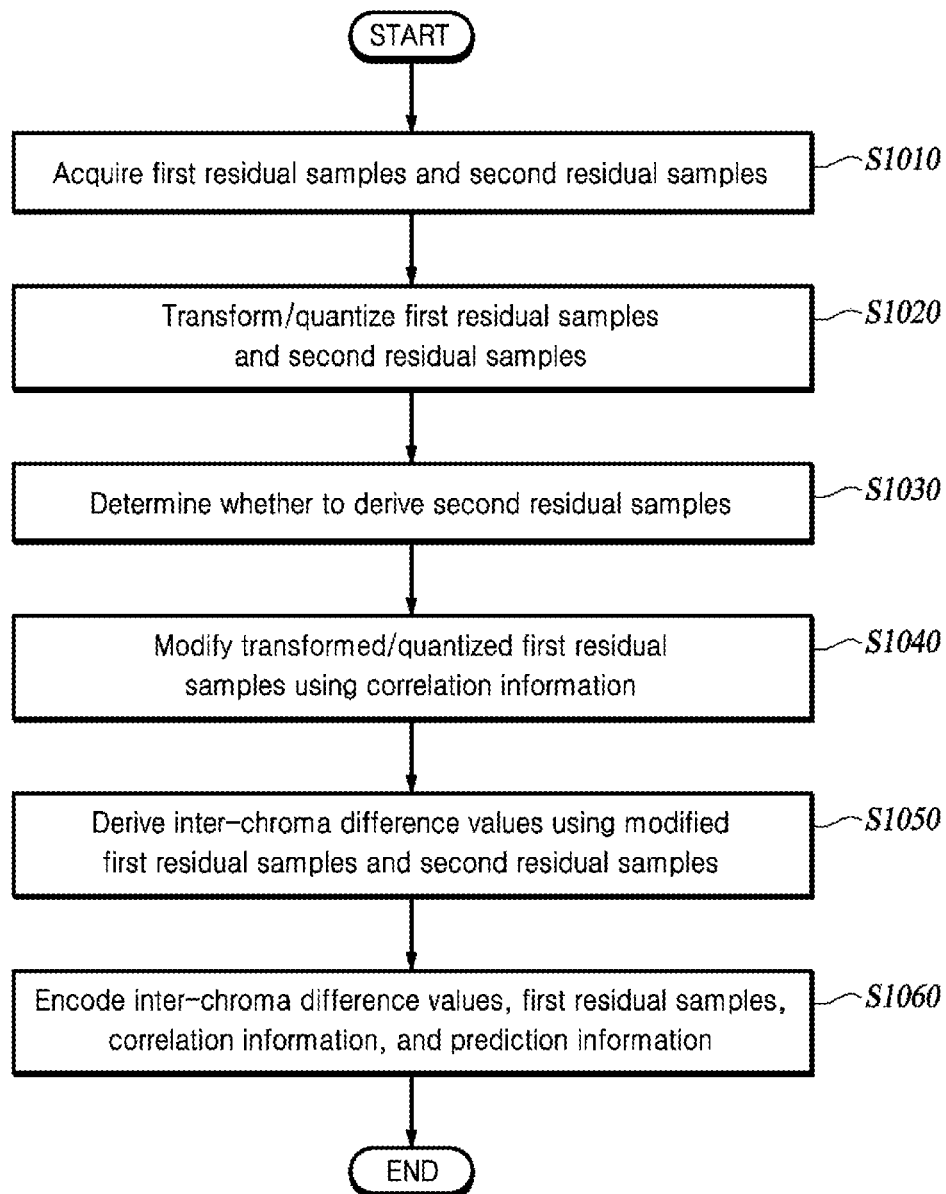
FIG. 10 is a flowchart illustrating an example of a residual block reconstruction method for chroma components implemented in the video encoding apparatus of FIG. 9.
Figure 11:
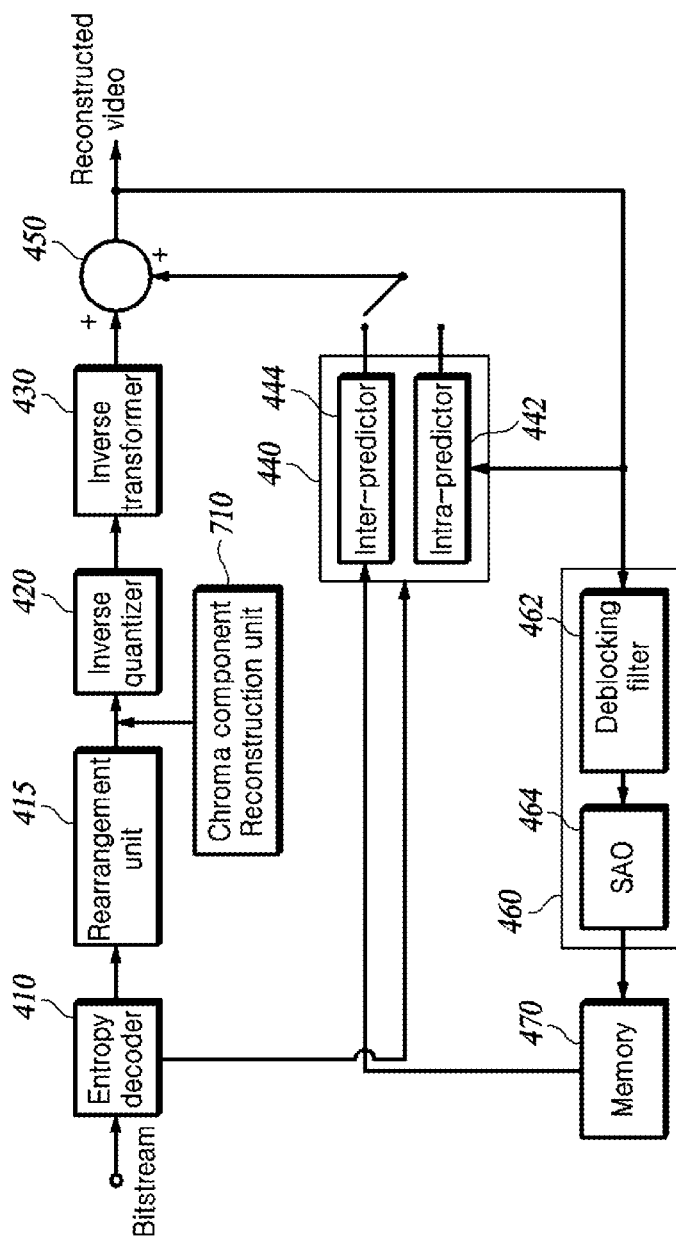
FIG. 11 is a block diagram illustrating a video decoding apparatus that can implement another example of a residual block reconstruction method for chroma components.
Figure 12:
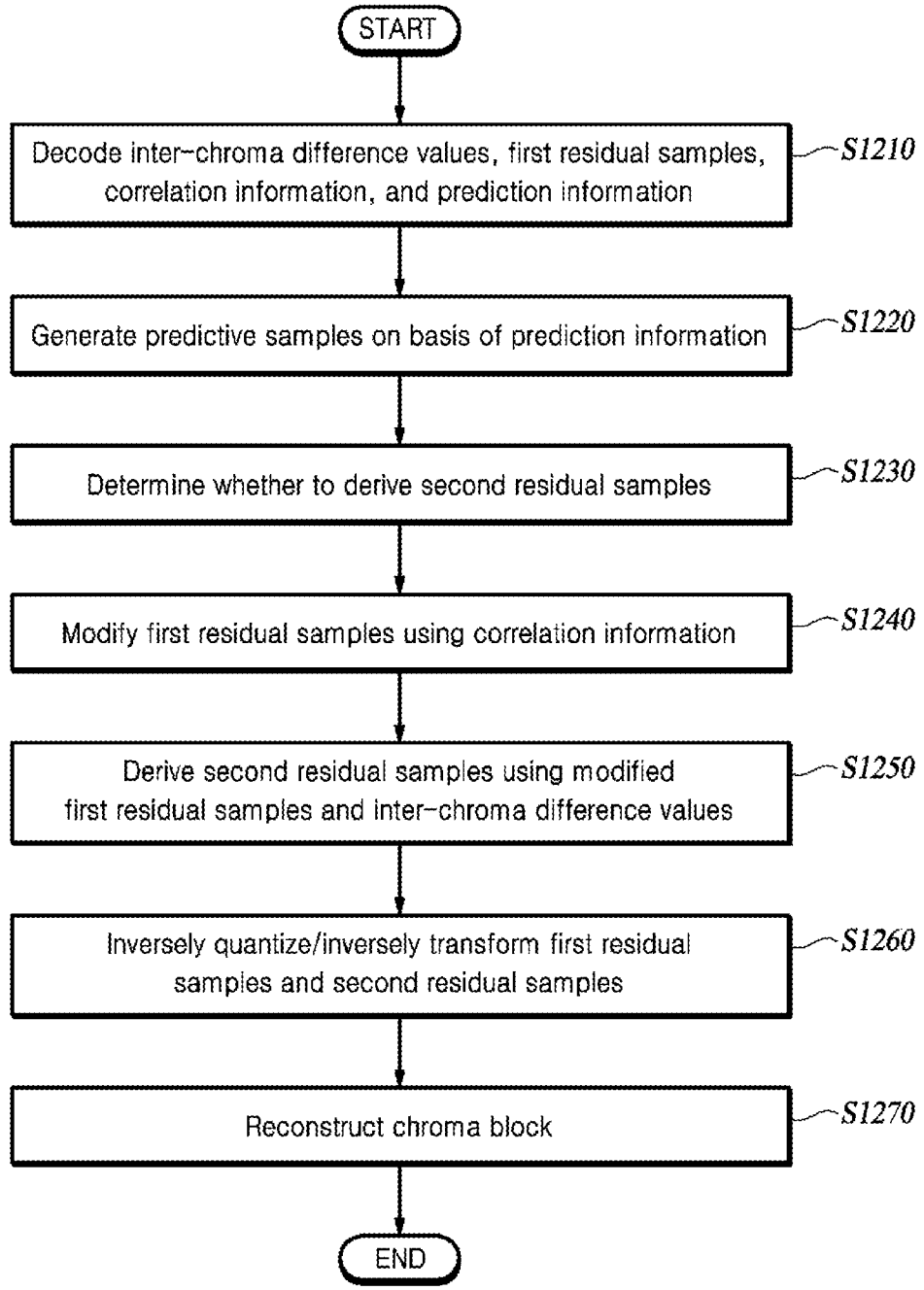
FIG. 12 is a flowchart illustrating an example of a residual block reconstruction method implemented in the video decoding apparatus of FIG. 11.

An exemplary block diagram and flowchart of a video encoding apparatus for performing Embodiment 1-2 are shown in FIGS. 9 and 10, respectively, and an exemplary block diagram and flowchart of a video decoding apparatus for performing Embodiment 1-2 are shown in FIGS. 11 and 12, respectively.

A subtractor 130 may obtain a first residual samples and a second residual samples (S1010). Residual samples of each of chroma components may be acquired by subtracting the prediction block and the chroma block of each of the chroma components, and the prediction block and the prediction information of each of the chroma components is derived through the prediction process of a predictor 120.

A transformer 140 may transform the first residual samples and the second residual samples, and a quantizer 145 may quantize the transformed first residual samples and the transformed second residual samples (S1020). Here, the second residual samples may be quantized as a value obtained by adding a quantization offset for quantization of the second residual samples to a quantization parameter of the first residual samples. The quantization offset may be determined by various methods. For example, the quantization offset may be adaptively determined according to one or more of the range of a luma component value (the range of a brightness value), the size of the first residual sample values, and the bit-depth of the second residual samples. As another example, the quantization offset may be determined as a value preset in a video encoding apparatus and a video decoding apparatus. The video decoding apparatus may determine a quantization parameter using delta-QP signaled from the video encoding apparatus, add the quantization offset to the quantization parameter to derive a quantization parameter of the second residual samples, and then inversely quantize the second residual samples using the derived quantization parameter. The quantization/inverse quantization method using the quantization offset may be applied to other embodiments of the present specification.

According to an embodiment, quantization coefficients of "0" may be derived through a quantization process for the second residual samples (i.e., there may be no residual signal in the quantization process). In this case, information or a syntax element indicating that quantization coefficients of "0" are derived may be signaled from the video encoding apparatus to the video decoding apparatus.

Meanwhile, one or more of a quantization parameter value of the first residual sample (to which the quantization offset is not added) (first value), a value obtained by adding the quantization offset to the quantization parameter of the first residual sample (second value), and the average of the first value and the second value may be used in an in-loop filtering process for the second residual sample. For example, one or more of the first value, the second value, and the average may be used as a parameter for determining the in-loop filtering strength of the second residual sample or may be used as a parameter for determining an index in a table for determining boundary strength. A method in which one or more of the first value, the second value, and the average value are used in the in-loop filtering process may be applied to other embodiments of the present specification.

The chroma component predictor 510 may determine whether to derive the second residual samples from the first residual samples (S1030). The chroma component predictor 510 may modify the quantized first residual samples when it is determined to derive the second residual samples (S1040). The modification of the first residual samples may be performed by applying the correlation information to the quantized first residual samples.

The chroma component predictor 510 may derive an inter-chroma difference values using the modified first residual samples and the quantized second residual samples (S1050). The inter-chroma difference values may be derived by performing a subtraction between the modified first residual samples and the quantized second residual samples.

Operation S1040 and operation S1050 may be performed through Equation 4 below.

$$Q(T(\text{Cro\_r})) = Q(T(\text{Cro\_resi2})) - (W*Q(T(\text{Cro\_resi1})) + \text{Offset}) \quad \text{[Equation 4]}$$

In Equation 4, $Q(T(\text{Cro\_resi1}))$ denotes the transformed and quantized first residual samples, $Q(T(\text{Cro\_resi2}))$ denotes the transformed and quantized second residual samples, and $Q(T(\text{Cro\_r}))$ denotes the inter-chroma difference values derived from the transformed and quantized first residual samples and the transformed and quantized second residual samples.

The inter-chroma difference values, the first residual samples, the correlation information, and the prediction information may be encoded and signaled to the video decoding apparatus (S1060). Here, the second residual samples are not signaled.

The entropy decoder 410 may decode the inter-chroma difference values, the first residual samples, the correlation information, and the prediction information from a bitstream (S1210). The predictor 440 may generate (or reconstruct) predicted samples (predictive block) of the first chroma component and predicted samples of the second chroma component on the basis of the prediction information (S1220).

The chroma component reconstruction unit 710 may determine whether to derive the second residual samples from the first residual samples (i.e., whether to activate and/or apply the second-residual-sample derivation method) (S1230). A detailed description of operation S1230 will be described below through a separate embodiment.

The chroma component reconstruction unit 710 may modify the first residual samples using the correlation information when it is determined to derive the second residual samples (S1240). Also, the chroma component reconstruction unit 710 may derive the second residual samples using the modified first residual samples and the inter-chroma difference values (S1250). The second residual samples may be derived by adding the modified first residual samples and the inter-chroma difference values.

Operation S1240 and operation S1250 may be performed through Equation 5 below.

$$Q(T(\text{Cro\_resi2})) = (W*Q(T(\text{Cro\_resi1})) + \text{Offset}) + Q(T(\text{Cro\_r})) \quad \text{[Equation 5]}$$

The inverse quantizer 420 may inversely quantize the first residual samples and the derived second residual samples and may inversely transform the inversely quantized first residual samples and the inversely quantized second residual samples (S1260). The adder 450 may reconstruct the chroma block of the first chroma component by adding the inversely transformed first residual samples and the prediction block of the first chroma component and may reconstruct the chroma block of the second chroma component by adding the inversely transformed second residual samples and the prediction block of the second chroma component (S1270).

Embodiment 2

Embodiment 2 is a method of predicting and deriving second residual samples using correlation information without using inter-chroma difference values.

Embodiment 2 is different from Embodiment 1 in that inter-chroma difference values are not used and a process of deriving the inter-chroma difference values (S640 or S1050) is not performed.

Except for this distinctions, the remaining processes of Embodiment 1 may also be performed in Embodiment 2. Accordingly, as in Embodiment 1-1, a process of deriving correlation information in a video encoding apparatus may be performed before a step of transforming residual samples, and a process of deriving second residual samples in a video decoding apparatus may be performed after a step of inversely transforming residual samples. Also, as in Embodiment 1-2, a process of deriving correlation information in a video encoding apparatus may be performed after a step of quantizing residual samples, and a process of deriving second residual samples in a video decoding apparatus may be performed before a step of inversely quantizing residual samples. However, the remaining steps except for the step of transforming/quantizing residual samples and the step of inversely quantizing/inversely transforming residual samples will be described below.

Figure 13:
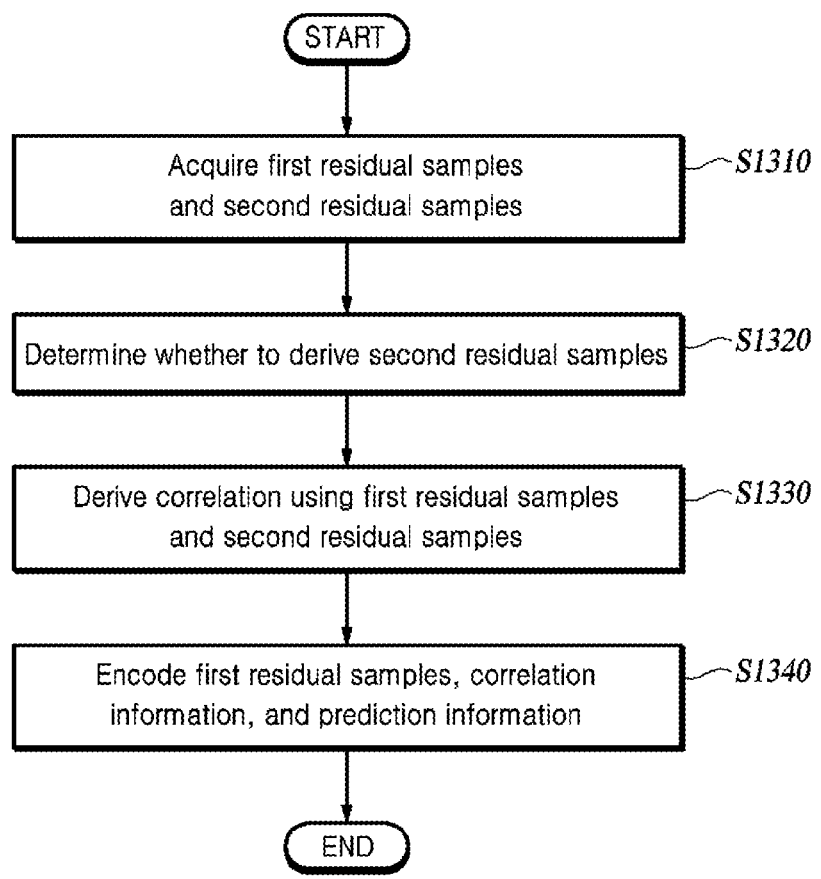
FIGS. 13 and 14 are flowcharts illustrating other examples of a residual block reconstruction method for chroma components.
Figure 14:
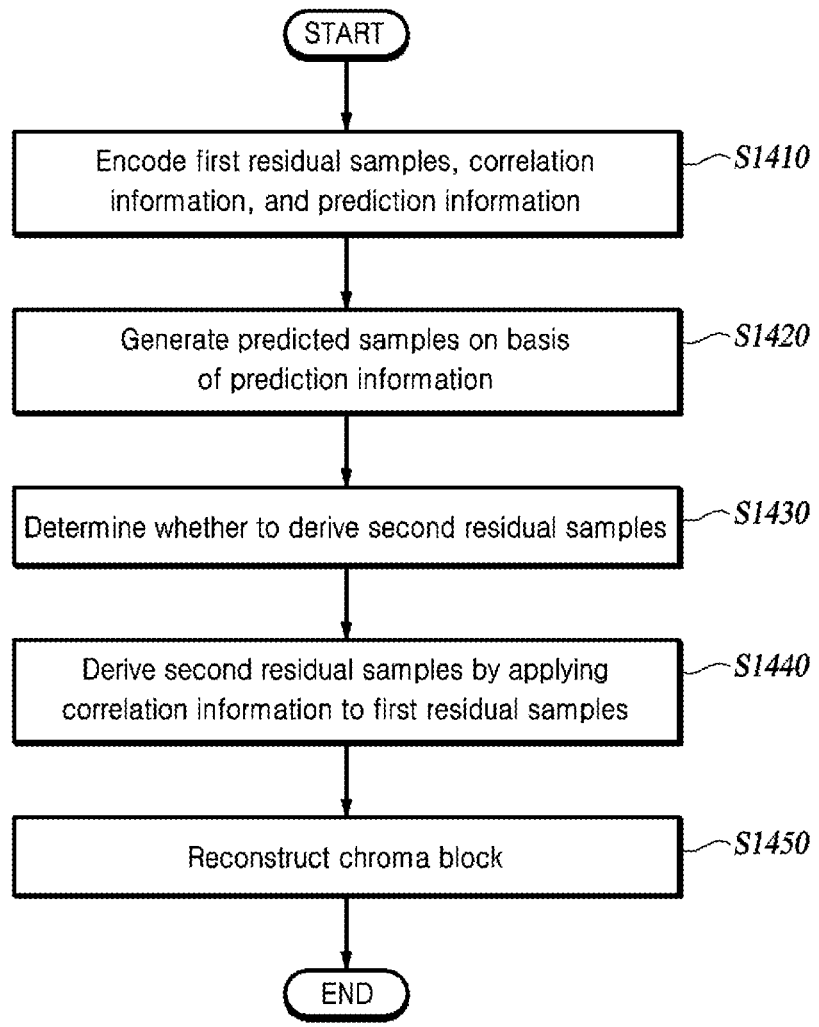
Figure 15:
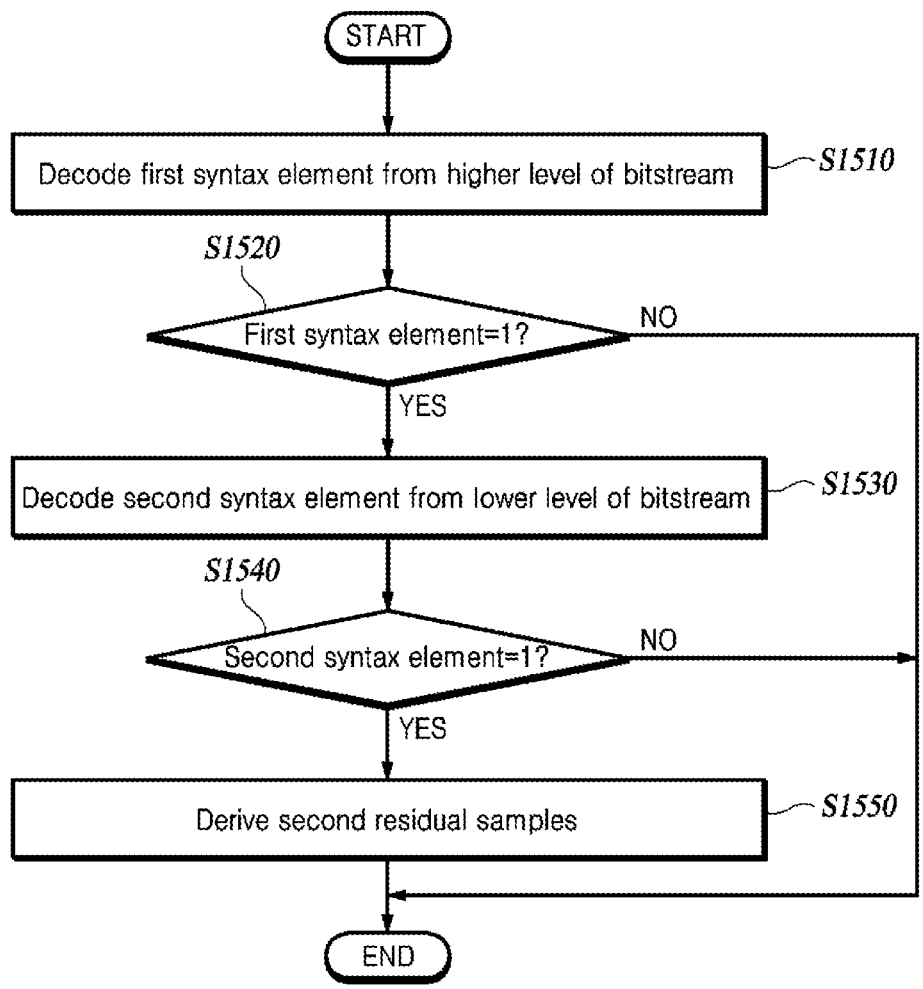
FIG. 15 is a flowchart illustrating an example of performance conditions of a residual reconstruction method for chroma components.

FIGS. 13 and 14 show flowcharts illustrating an example for Embodiment 2.

The subtractor 130 may subtract the prediction block of the first chroma component and the chroma block of the first chroma component to acquire the first residual samples and may subtract the prediction block of the second chroma component and the chroma block of the second chroma component to acquire the second residual samples (S1310).

The chroma component predictor 510 may determine whether to derive the second residual samples from the first residual samples (S1320). The chroma component predictor 510 may derive the correlation information using the first residual samples and the second residual samples when it is determined to derive the second residual samples (S1330).

Meanwhile, depending on the embodiment, the second-residual-sample derivation method may include the following three modes when only multiplication information is included in the correlation information.

1) Mode 1: The values of the Cb residual samples are signaled, and the values of the Cr residual samples are derived by applying a multiplication factor of −½ or +½ to the values of the Cb residual samples.
2) Mode 2: The values of the Cb residual samples are signaled, and the values of the Cr residual samples are derived by applying a multiplication factor of −1 or +1 to the values of the Cb residual samples.
3) Mode 3: The values of the Cr residual samples are signaled, and the values of the Cb residual samples are derived by applying a multiplication factor of −½ or +½ to the values of the Cr residual samples.

Also, the second-residual-sample derivation method may further include modes in which an offset factor is applied to each of the first to third modes when the offset information is also included in the correlation information.

In this embodiment, the chroma component predictor 510 may determine a mode having the best rate distortion characteristic among the above modes as a mode for the chroma block. The chroma component predictor 510 may integratedly perform a process of determining one of the above-described general method and the second-residual-sample derivation method and a process of determining one of the modes of the second-residual-sample derivation method. For example, the chroma component predictor 510 may determine a mode or method having the best rate distortion characteristic, among the general method and the modes in the second-residual-sample derivation method, for the chroma block.

The first residual samples, the correlation information, and the prediction information may be encoded and signaled to the video decoding apparatus (S1340). Here, the second residual samples and the inter-chroma difference values are not signaled.

The entropy decoder 410 may decode the first residual samples, the correlation information, and the prediction information from a bitstream (S1410).

The predictor 440 may generate (or reconstruct) the predicted samples (predictive block) of the first chroma component and the predicted samples of the second chroma component on the basis of the prediction information (S1420).

The chroma component reconstruction unit 710 may determine whether to derive the second residual samples from the first residual samples (i.e., whether to activate and/or apply the second-residual-sample derivation method) (S1430). A detailed description of operation S1430 will be described below through a separate embodiment.

The chroma component reconstruction unit 710 may derive the second residual samples by applying the correlation information to the first residual samples when it is determined to derive the second residual samples (S1440). For example, when the correlation information includes the multiplication information, the second residual samples may be derived by applying a multiplication factor indicated by the multiplication information to the first residual samples. As another example, when the correlation information includes the multiplication information and the offset information, the second residual samples may be derived by applying an offset factor indicated by the offset information to the first residual samples to which the multiplication factor is applied.

Operation S1440 may be performed through Equation 6 below.

$$\text{Cro\_resi2} = W * \text{Cro\_resi1} + \text{Offset} \qquad [\text{Equation 6}]$$

Comparing Equation 6 to Equations 2 to 5, it can be seen that, in Embodiment 2, an inter-chroma difference value is not used (i.e., Cro_r=0). Accordingly, a transform/inverse transform process, a quantization/inverse quantization process, and an encoding/decoding process are not performed on the inter-chroma difference values.

The adder 450 may reconstruct the chroma block of the first chroma component by adding the first residual samples and the prediction block of the first chroma component and may reconstruct the chroma block of the second chroma component by adding the derived second residual samples and the prediction block of the second chroma component (S1450).

Embodiment 3

Embodiment 3 is a method of determining whether to derive the second residual samples from the first residual samples (i.e., whether to allow (activate) and/or apply the second-residual-sample derivation method).

Whether to perform the second-residual-sample derivation method may be determined by various criteria. The various criteria may include 1) a value of a syntax element (e.g., flag) indicating whether to allow and/or apply the derivation of the second residual samples (i.e., whether it is on or off), 2) a prediction mode of a target block, 3) the range of a luma component value, etc.

Criterion 1: Syntax Element Indicating On/Off

A first syntax element and/or a second syntax element may be employed in order to indicate whether to derive the second residual samples.

The first syntax element, which is a syntax element indicating whether to allow (or activate) the second-residual-sample derivation method (i.e., whether it is on or off), may be defined at various positions of a bitstream and signaled to the video decoding apparatus. For example, the first syntax element may be defined and signaled at the level of CTU or higher or may be defined and signaled at one or more of unit block (PU, TU, CU) levels, tile level, tile group level, and picture level.

The second syntax element, which is a syntax element indicating whether to apply the second-residual-sample derivation method to a target block (aroma block) (i.e., whether it is on or off for the target block), may be defined at various positions of a bitstream and signaled to the video decoding apparatus. For example, the second syntax element may be defined and signaled at the level of CTU or higher or may be defined and signaled at one or more of unit block (PU, TU, CU) levels, tile level, tile group level, and picture level.

According to an embodiment, the first syntax element may be defined and signaled at a relatively higher level in the bitstream, and the second syntax element may be defined and signaled at a relatively lower level in the bitstream. In this case, the second syntax element may not be signaled at the lower level when the second-residual-sample derivation method is switched off at the higher level, and whether to switch on or off at the lower level may be selectively determined even when the second-residual-sample derivation method is switched on at the higher level. Therefore, it is possible to improve the bit efficiency for the second-residual-sample derivation method.

FIG. 13 shows an example of determining whether to switch on or off the second-residual-sample derivation method.

The video encoding apparatus may determine whether the second-residual-sample derivation method is allowed and may set a value of the first syntax element based on a result of the determination and signal the first syntax element to the video decoding apparatus. Also, the video encoding apparatus may determine whether the second-residual-sample derivation method is applied and may set a value of the second syntax element a result of the determination and signal the second syntax element to the video decoding apparatus.

The video decoding apparatus may decode the first syntax element from a bitstream (S1510) and may determine whether the second-residual-sample derivation method is allowed according to a value of the first syntax element (S1520).

When the second syntax element indicates that the second-residual-sample derivation method is allowed (i.e., first syntax element=1; S1520), the video decoding apparatus may decode the second syntax element from the bitstream (S1530). Also, the video decoding apparatus may determine whether the second-residual-sample derivation method is applied according to a value of the second syntax element (S1540).

When the second syntax element indicates that the second-residual-sample derivation method is applied to the target block (i.e., second syntax element=0; S1540), the video decoding apparatus may derive the second residual sample on the basis of the correlation information and the first residual samples (or the correlation information, the first residual samples, and the inter-chroma difference values) for the target block (S1550).

The derivation of the second residual sample is not performed for the target block when the first syntax element indicates that the second-residual-sample derivation method is not allowed in operation S1520 (i.e., first syntax element=0) or when the second syntax element indicates that the second-residual-sample derivation method is not applied in operation S1540.

Criterion 2: Prediction Mode of Target Block

Whether to switch on or off the second-residual-sample derivation method may be adaptively determined in consideration of or according to the prediction mode of the target block (chroma block).

For example, when the chroma block is predicted in one mode among an intra mode, an inter mode, an IBC mode, and a palette mode, the derivation of the second residual samples may be switched on or off. As another example, when the chroma block is predicted in two or more modes among an intra mode, an inter mode, an IBC mode, and a palette mode (when the chroma block is predicted in one of the two or more modes), the derivation of the second residual samples may be switched on or off.

As still another example, when the chroma block is predicted through a cross-component linear model (CCLM) or a direct mode (DM) among ultra prediction modes, the derivation of the second residual samples may be switched on or off. In this case, information indicating the switching on or off of the derivation of the second residual samples may be signaled to the video decoding apparatus only when the chroma block is predicted through CCLM or DM.

As still another example, when the chroma block is predicted through a bi-prediction mode or a merge mode among inter prediction modes and when the chroma block is predicted with reference to a zeroth reference image, the derivation of the second residual sample may be switched on or off. Information indicating the switching on or off of the derivation of the second residual samples may be signaled to the video decoding apparatus only when the chroma block is predicted through a bi-prediction mode or a merge mode or only when the chroma block is predicted with reference to a zeroth reference image.

An example of considering the prediction mode of the chroma block may be combined with the above example of using the first syntax element and the second syntax element. For example, in operation S1520, when the first syntax element equals to 1 and the prediction mode of the chroma block corresponds to a prediction mode in which the derivation of the second residual samples is switched on, the second syntax element may be decoded from a bitstream. (S1530). That is, whether to decode the second syntax element may be determined in consideration of the prediction mode of the chroma block.

Criterion 3: Range of Values of Luma Component

The range of values of a luma component (the range of luminance values) may be divided into two or more sections and, depending on which section the values of the luma component of the target block belong to among the divided sections, whether to apply the second-residual-sample derivation method may be determined.

For example, in the case where the range of the values of the luma component is divided into two sections (the first section and the second section), the second-residual-sample derivation method may not be applied when the values of the luma component of the target block belong to the first section, and the second-residual-sample derivation method may be applied when values of the luma component of the target block belong to the second section, and vice versa.

Among the two or more sections, a section to which the second-residual-sample derivation method is not applied may correspond to a "visual perception section" to which a user's vision can react sensitively, and a section to which the second-residual-sample derivation method is applied may not correspond to the "visual perception section." Accordingly, instead of being applied to the visual perception section, the second-residual-sample derivation method may be selectively applied only to sections other than the visual perception section, and thus it is possible to prevent deterioration of subject image quality.

One or more section value of a section value indicating the range of the first section and a section value indicating the range of the second section may be signaled from the video encoding apparatus to the video decoding apparatus. Depending on the embodiment, the section value may be preset between the video encoding apparatus and the video decoding apparatus without signaling.

Criterion 4: Quantization Result

When quantization coefficients for the second residual samples have very small values (i.e., when a small number of quantization coefficients occur or exist) due to the accuracy of the prediction of the second chroma component, the second-residual-sample derivation method may be selectively applied. Also, in this case, the quantization of only a part, not the whole, of the second residual sample may not be omitted (i.e., only some of the second residual samples are signaled).

Other Criteria

When the delta-QP (DQP) of the luma component is greater than or equal to a preset value, when a transform skip mode is not applied to a chroma block, or when a block differential coded modulation (BDPCM) mode is not applied to a target block, the second-residual-sample derivation method may or may not be applied to the target block.

When a picture including the target block is a gradual random access (GRA) picture or an instantaneous decoding recoding (IDR) picture for random access, the second-residual-sample derivation method may not be applied to the target block.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method for reconstructing a chroma block of a target block to be reconstructed, the method comprising:
    decoding correlation information between first residual samples and second residual samples, information on transform coefficients corresponding to the first residual samples for the chroma block, and prediction information for the chroma block from a bitstream, wherein the first residual samples are residual samples of a first chroma component and the second residual samples are residual samples of a second chroma component;
    generating predicted samples of the first chroma component and predicted samples of the second chroma component on the basis of the prediction information;
    inversely transforming the transform coefficients to generate the first residual samples for the chroma block;
    deriving the second residual samples by applying the correlation information to the first residual samples; and
    reconstructing a chroma block of the first chroma component by adding the first residual samples and the predicted samples of the first chroma component and reconstructing a chroma block of the second chroma component by adding the second residual samples and the predicted samples of the second chroma component.

2. The method of claim 1, wherein the first chroma component is one of a Cb chroma component and a Cr chroma component, and the second chroma component is the other of the Cb chroma component and the Cr chroma component.

3. The method of claim 1, wherein the decoding comprises decoding the correlation information from a picture level of the bitstream.

4. The method of claim 1, wherein the correlation information includes multiplication information for indicating a multiplication factor between the first residual samples and the second residual samples, and
    wherein the deriving of the second residual samples comprises deriving the second residual samples by applying a multiplication factor indicated by the multiplication information to the first residual samples.

5. The method of claim 4, wherein the correlation information further includes offset information for indicating an offset factor between the first residual samples and the second residual samples, and
    wherein the deriving of the second residual samples comprises deriving the second residual samples by applying an offset factor indicated by the offset information to the first residual samples to which the multiplication factor is applied.

6. The method of claim 1, wherein the decoding comprises:
    decoding a first syntax element indicating whether a derivation of the second residual samples is allowed, from a sequence parameter set (SPS) level of the bitstream; and
    when the first syntax element indicates that the derivation of the second residual samples is allowed, decoding a second syntax element indicating whether the derivation of the second residual samples is applied to the chroma block, from a level lower than the SPS level in the bitstream, and
    wherein the deriving of the second residual samples comprises deriving the second residual samples when the second syntax element indicates that the derivation of the second residual samples is applied to the chroma block.

7. The method of claim 6, wherein the decoding of a second syntax element comprises decoding the second syntax element in consideration of a predictive mode of the target block.

8. A method for encoding a chroma block of a target block, the method comprising:
- encoding, into a bitstream, correlation information between first residual samples and second residual samples, information on transform coefficients corresponding to the first residual samples for the chroma block, and prediction information for the chroma block, wherein the first residual samples are residual samples of a first chroma component and the second residual samples are residual samples of a second chroma component;
- generating predicted samples of the first chroma component and predicted samples of the second chroma component based on the prediction information;
- inversely transforming the transform coefficients to generate the first residual samples for the chroma block;
- deriving the second residual samples by applying the correlation information to the first residual samples; and
- reconstructing a chroma block of the first chroma component based on the first residual samples and the predicted samples of the first chroma component, and reconstructing a chroma block of the second chroma component based on the second residual samples and the predicted samples of the second chroma component.

9. A method for providing a bitstream containing encoded video data to a video decoding apparatus, the method comprising:
- generating the bitstream by encoding a chroma block of a target block; and
- transmitting the bitstream to the video decoding apparatus,
- wherein generating the bitstream comprises:
- encoding, into the bitstream, correlation information between first residual samples and second residual samples, information on transform coefficients corresponding to the first residual samples for the chroma block, and prediction information for the chroma block, wherein the first residual samples are residual samples of a first chroma component and the second residual samples are residual samples of a second chroma component;
- generating predicted samples of the first chroma component based on the prediction information;
- generating the first residual samples for the chroma block and predicted samples of the second chroma component based on the predicted samples of the first chroma component;
- inversely transforming the transform coefficients to generate the first residual samples for the chroma block;
- deriving the second residual samples by applying the correlation information to the first residual samples; and
- reconstructing a chroma block of the first chroma component based on the first residual samples and the predicted samples of the first chroma component, and reconstructing a chroma block of the second chroma component based on the second residual samples and the predicted samples of the second chroma component.

* * * * *